Figure 1:
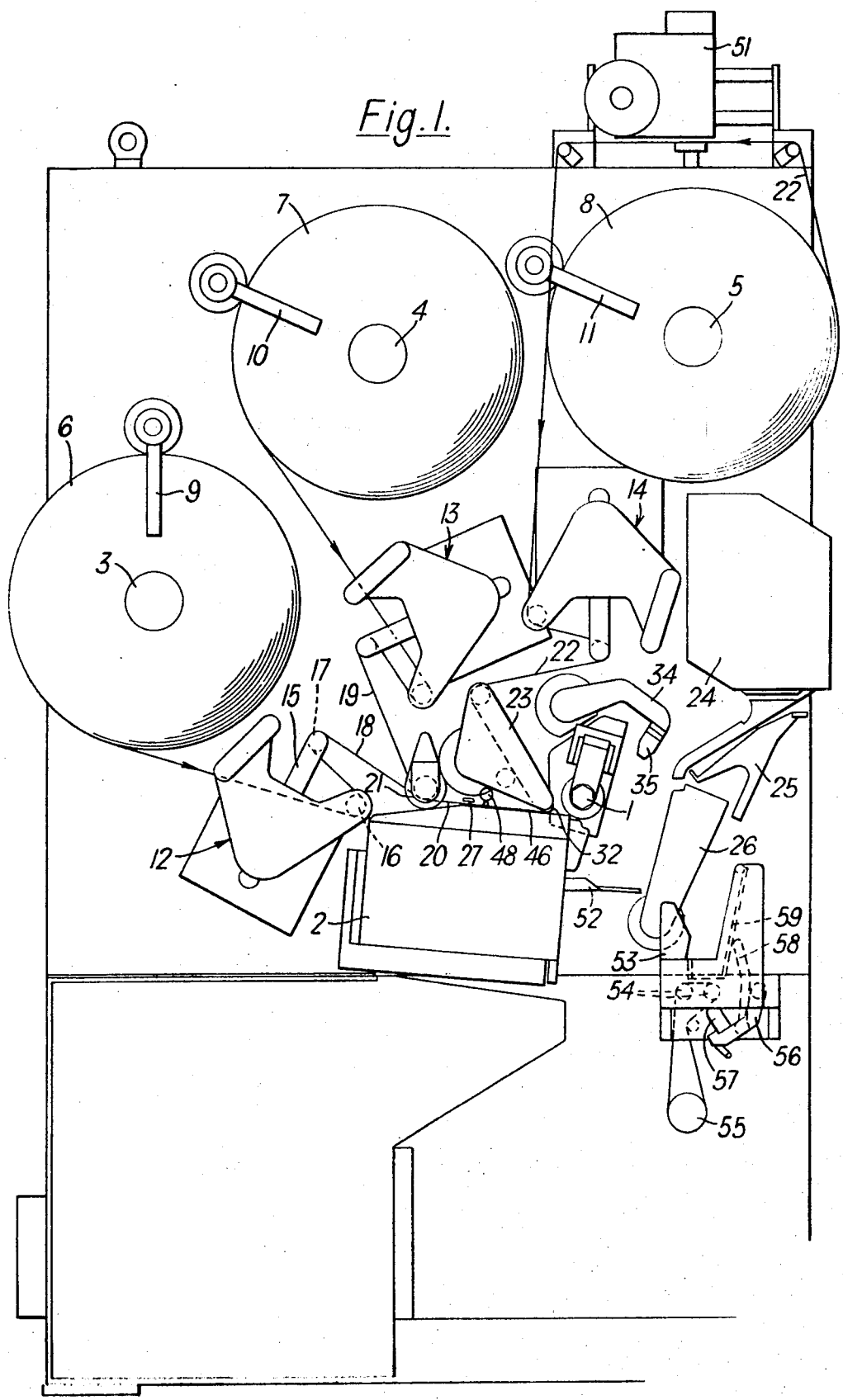

United States Patent
Harvey et al.

[15] 3,689,002
[45] Sept. 5, 1972

[54] CAPACITOR WINDING APPARATUS

[72] Inventors: Peter Harvey; David James Greene; Edward Zbigniew Kaczmarski, all of London, England

[73] Assignee: British Insulated Callender's Cables Limited, London, England

[22] Filed: Sept. 1, 1970

[21] Appl. No.: 68,647

[30] Foreign Application Priority Data

Sept. 4, 1969 Great Britain..........43,773/69

[52] U.S. Cl. ................242/56.1, 242/74, 242/75.2, 242/75.51
[51] Int. Cl..........................B65h 39/16, H01g 13/02
[58] Field of Search......242/56.1, 74, 75, 75.2, 75.51

[56] References Cited

UNITED STATES PATENTS

| | | | |
|---|---|---|---|
| 3,471,098 | 10/1969 | Jannett | 242/56.1 |
| 3,432,901 | 3/1969 | Fanning | 242/56.1 X |
| 2,955,773 | 10/1960 | Burke | 242/56.1 |
| 2,951,655 | 9/1960 | Marcus | 242/56.1 |
| 2,740,592 | 4/1956 | Larsen | 242/56.1 |

*Primary Examiner*—George F. Mautz
*Assistant Examiner*—Edward J. McCarthy
*Attorney*—Webb, Burden, Robinson & Webb

[57] ABSTRACT

An automatic machine for producing wound capacitor elements includes essentially a drive for a mandrel, which may or may not carry a tubular former for the element; an automatic timing device for starting and stopping rotation of the mandrel; a device for folding the leading end of an assembly of conducting and dielectric strips around the mandrel; a tension sensing device for sensing the tension in the length of the assembled strips between the mandrel and a temporary clamp for the strips; and a device for starting up the automatic timing device when, upon rotation of the mandrel, an increase in tension in the length of assembled strips operates the sensing device as an indication that the leading end has been successfully folded around the mandrel and trapped, so that winding can commence.

14 Claims, 3 Drawing Figures

CAPACITOR WINDING APPARATUS

This invention relates to apparatus for use in the manufacture of wound capacitors and has as its principal object the provision of an automatic machine for producing wound capacitor elements from metallized plastics films.

A wound capacitor element consists essentially of a roll formed from a composite strip comprising at least four layers, two at least of which are of dielectric material and at least two of which are of conducting material, the layers of conducting material alternating with the layers of dielectric material. The composite strip may either be assembled during the winding process from separate metal foils and dielectric films or from two or more metallized dielectric films or it may be a preformed composite strip, and the term "composite" strip will hereinafter, where appropriate, refer to either form.

The invention is applicable both to capacitor elements wound on a tubular former that remains in the element and to elements made without such a former, and the term "mandrel" will be used hereinafter, where appropriate, to refer to a winding spindle carrying a tubular former or a winding spindle not carrying a former and which itself forms the mandrel on which the element is wound.

The apparatus in accordance with the invention comprises a drive for rotatably driving the mandrel, automatic timing means for starting and stopping the rotation of the mandrel, means for folding the leading end of the composite strip around the mandrel, means for sensing the tension in the length of composite strip between the mandrel and a temporary clamp for the composite strip, and means for starting up the automatic timing means when, upon rotation of the mandrel, an increase in tension in said length operates the sensing means as an indication that the leading end of the composite strip has been successfully folded around the mandrel and trapped, so that winding can commence.

The sensing means preferably comprises a feeler bar that is only brought into contact with the said length of composite strip during or just before the operation of feeding the end of the strip around the mandrel and is then withdrawn into an inoperative position, after it has caused the timing means to start.

When the timing means starts under the action of the sensing means, it preferably immediately stops the rotation of the mandrel, unclamps the composite strip, if necessary removes the means for folding the leading end of the composite strip around the mandrel from its operative position, and then restarts the mandrel and a counter for counting the length or number of turns of composite strip wound onto the mandrel, with the object of stopping the winding operation when an element is completely wound.

The clamp for the composite strip and the means for folding the end of the strip on the mandrel are preferably mounted on a carriage which can be caused to approach or retreat from the plane of the composite strip as it moves onto the mandrel and which can be reciprocated and rotated between a functional position and a retracted position, which latter position it occupies during the winding operation.

The same carriage may also carry means for partially severing the composite strip, e.g. by perforating it, and part of the carriage may form a table against which the free end of the cut composite strip may be retained by suction means and against which the composite strip can be held by the clamp.

Means may be provided for wrapping a covering strip around the wound element and the same table forming part of the carriage may be used for assisting in this operation, and in particular the same partial severing means may be used for the wrapping strip.

Further features of the present invention will be apparent from the following description of one example of an automatic capacitor winding machine, in accordance with the invention, adapted to form wrapped capacitor elements from two polypropylene films each metallized on one surface to leave a narrow unmetallized margin along one edge and a heat sealable wrapping film which is applied around the wound element, for example a polypropylene film coated with polyethylene.

Figure 2:
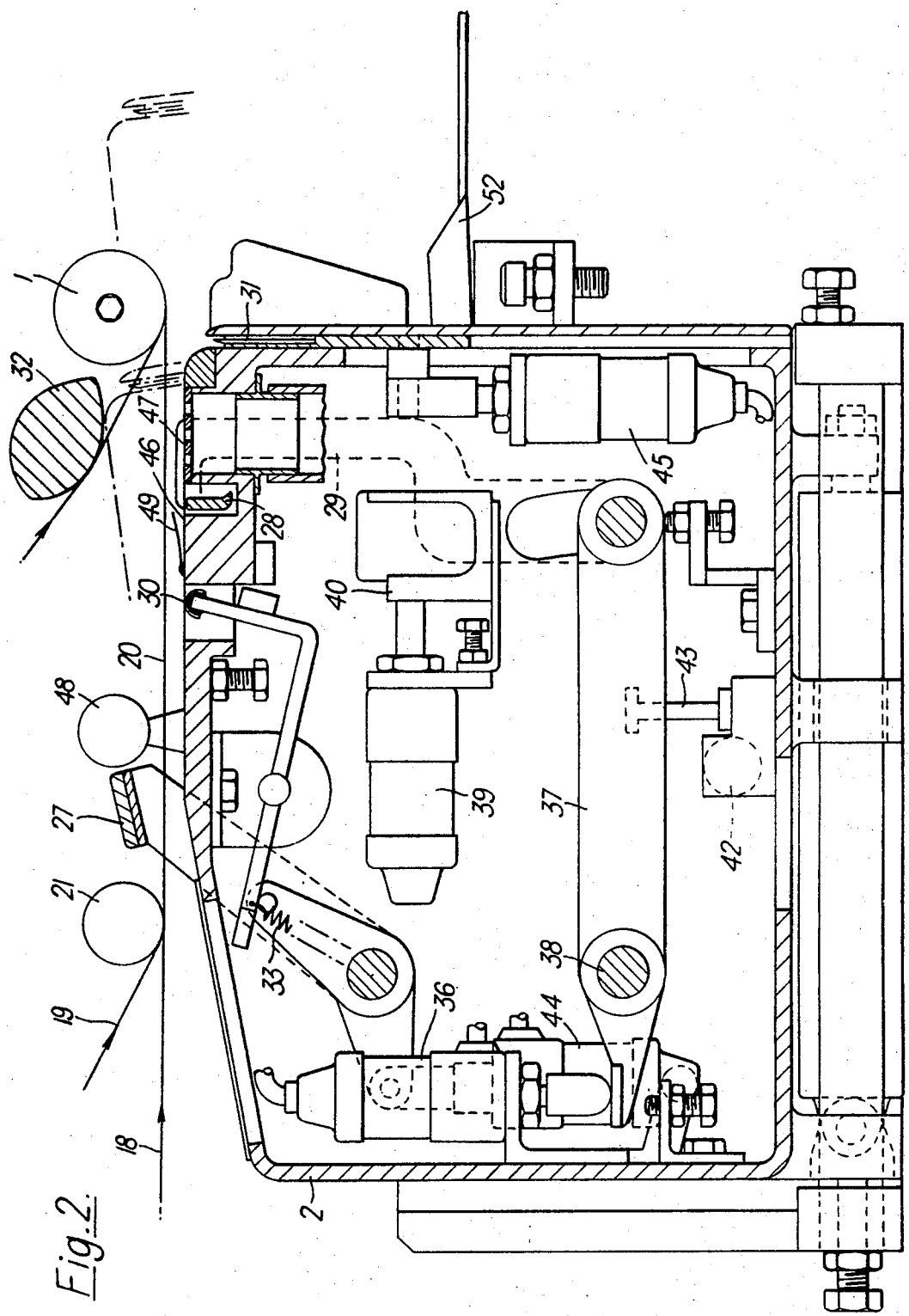
Figure 3:
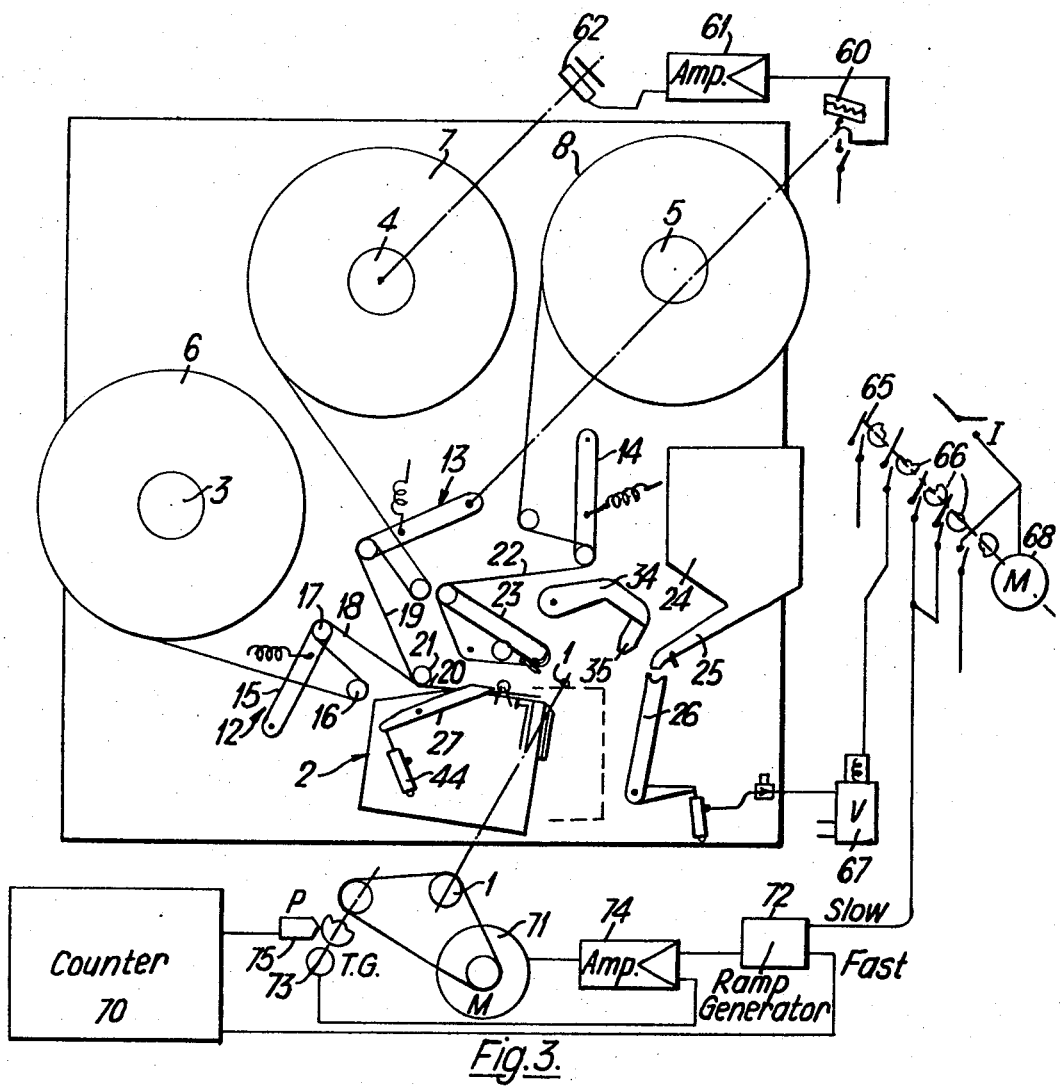

The general assembly of the machine is shown in elevation, in FIG. 1 of the attached drawings;

FIG. 2 shows an elevation, with parts removed, or a reciprocating carriage which is referenced 2 in FIG. 1, and FIG. 3 is a diagrammatic representation of the machine showing control devices thereof.

The machine being described by way of example is of the kind designed for winding capacitor elements on a tubular former which for this purpose is fitted on to a rotating driven spindle 1 of hexagonal cross-section.

FIG. 1 is an elevation of the main base plate of the machine which is a vertical plate and is seen in the drawing from the side from which the driven spindle 1 and spindles carrying a supply of the films project. Spindles 3 and 4 carry pads 6 and 7 of metallized polypropylene film and spindle 5 carries a pad 8 of the heat sealable wrapping film.

The three pads 6, 7 and 8 are each aligned on their spindles by means of retractable feelers 9, 10 and 11 mounted on fixed spindles projecting from the base plate, parallel to the spindles 3, 4 and 5. The feelers can be set on their carrying spindles by an adjustable device, for example a micrometer screw. The pad spindles 3, 4 and 5 each have a device by which a pad can be locked on the spindle and an adjustable screw threaded device which enables the pad to be correctly located against its respective feeler. After the feelers 9, 10 and 11 have been used to ensure that the pads are correctly located on their spindles they can be retracted by rotating them to a position in which they no longer make contact with the surfaces of the pads.

The tension in each film is maintained at the required value by means of a tension monitor (12, 13 and 14); each of the tension monitors comprises a spring biased pivoted frame 15, a fixed guide roller 16 mounted on the main base plate, and a dancer roller 17 mounted on the pivoted frame. Movement of the pivoted frame 15 in accordance with changes in the tension in the film operates a potentiometer 60 (FIG. 3) in the input circuit of an amplifier 61, the output circuit of which energizes a magnetically actuated friction brake 62 for the associated pad spindle.

The two metallized films 18 and 19 are brought together to form the composite strip 20 by a fixed guide roller 21 before being fed on to a tubular former carried by spindle 1. The wrapping film 22 passes from the tension monitor 14 through a further pivoted frame 23 which will be referred to as the wrapper arm.

Also seen in FIG. 1 are the reciprocating carriage 2 which is shown in greater detail in FIG. 2; a hopper 24 for feeding tubular formers each having a bore of hexagonal cross-section, via an escapement 25, one by one on to the upper end of a tube loading arm 26 which is pivoted in such a way at its lower end that it is adapted to fit the formers on to the hexagonal winding spindle 1 as the spindle advances from a retracted position; and a hot-foil transfer printing unit 51 whose printing head is caused to print an appropriate identification code on a surface of the wrapping film 22, which is led under the printing head on its way to the tension monitor 14, once for winding of each capacitor element.

Referring to FIG. 2 which shows the reciprocating carriage 2 in greater detail and to FIG. 3, it will be seen that a fixed roller 48 is carried by the carriage and the upper surface of the carriage forms a table 46 for supporting the free end of the composite strip 20 after the winding of one element has been completed and before the winding of the next element commences. For this purpose the right-hand (or forward end) of the table 46 is perforated at 47 and suction means (not shown) are provided below the surface of the table for applying suction through the perforated end 47 to cause the composite strip 20 to be held against the surface of the table at an appropriate stage, as will hereinafter be described.

The carriage 2 also carries a clamp 27, which is operated by a pneumatic cylinder 44 when the carriage is in a raised position in such a way as to cause the composite strip 20 to be gripped between the clamp and the table 46, and a leaf spring 49 which, when the carriage is in the raised and forward position, is in light contact with a former on the spindle.

The carriage 2 also supports mechanism for operating a transverse folding bar 28 which is supported at its ends by two vertical cranked bars, one of which 29 can be seen in FIG. 2; the method by which the folding bar 28 can be caused to fold the end of the composite strip 20 around the former by means of a linkage mechanism, operated by pneumatic cylinders, will be described later.

A number of pneumatic cylinders for carrying out such operations as operating the folding bar 28, retracting and raising and lowering carriage 2, rocking the wrapper arm 23 and the tube loader 26 about their pivots, and retracting the winding spindle 1 are controlled by solenoid valves 67 (FIG. 3), of which only one is shown, energized by cam switches indicated generally at 66 mounted on a cam shaft 65 which forms the main timing device for the apparatus. The cam shaft 65, which also carries a switch not shown controlling operation of the printing unit 51, is driven by an electric motor 68 in such a way as to complete one revolution during each winding cycle.

A revolution counter 70 is also provided for counting the number of revolutions made by the winding spindle 1 and for controlling an electric motor 71 by which this spindle is driven. The counter 70 is controlled by a trigger switch 75 which activates the counter for each revolution of the spindle 1. The speed of the motor 71 is controlled by a ramp generator 72 and a tachogenerator 73, coupled to the spindle 1 and providing a speed reference signal, through an amplifier 74 in such a way that the spindle 1 is given the required rate of acceleration and de-celeration and can be driven at a fast winding speed of about 3,000 r.p.m. and a slow winding speed of 120 r.p.m.

Other constructional details of the machine will be apparent from the following description of a winding cycle. It is convenient to begin the description of a cycle at an intermediate stage when the winding spindle 1 carrying a former is rotating at the fast speed and the composite strip 20 is being wound on the former to build up a capacitor element. At this stage in the cycle the carriage 2 is forward, that is it is moved to the right and to its lowered position so that the composite strip 20 passes from the guide roller 21, under the roller 48 carried by the carriage 2 on to the former and the suction at the perforated end 47 of the table 46 has no effect on the composite strip. The clamp 27, which is operated by the pneumatic cylinder 44, is raised to a position in which it is free from the composite strip 20 and the folding bar 28 is retracted into a recess in the table 46. A sensing bar 30 is also in a retracted position on the table 46, as is a foil perforator 31 carried on the forward end of the carriage 2. The wrapper arm 23 is raised free from the composite strip 20 and the tube loading arm 26 is in its retracted position. The timing cam shaft 65 is in its zero position, that is at the commencement of its single timing revolution.

At a pre-determined number of revolutions, as indicated by the counter 70, before the winding of an element will be completed, the counter operates a switch to cause de-celeration of the winding spindle 1 by means of the ramp generator 72 at a rate such that the spindle will be rotating at a slow winding speed when the required number of turns of composite strip 20 have been wound on the former.

When this stage is reached, the counter 70 operates a switch to stop the spindle 1 and start the cam shaft 65 and immediately the cam shaft starts, one of its cam switches 66 causes a pneumatic cylinder not shown to be energized to move the carriage 2 to its retracted position and to move the wrapper arm 23 into a position in which a shaped pressure member 32 presses the free end of the wrapping film 22 against the upper surface of the stationary composite strip 20. The motor 71 driving the spindle 1 is then restarted and the wrapping film 22 is drawn by the movement of the composite strip 20 into the nip between the tubular former and the moving composite strip by frictional or static attraction with the composite strip. The path of the wrapping film 22 over guides on the wrapper arm 23 is such that as the wrapper arm moves downwards the film tension is reduced and a slack loop is formed whereby, upon unclamping, the wrapping film is readily drawn into the nip as described above. A second cam switch on the cam shaft 65 stops the cam shaft immediately after the above operation has been initiated.

The successful trapping of the end of the wrapping film 22 will be indicated by an immediate build-up in the tension in the film and this causes the tension monitor 14 to move in a clockwise direction and operate a switch (not shown) which re-starts the cam shaft 65. A cam switch on the cam shaft then causes the wrapper arm 23 to be raised and the carriage 2 to be raised into a film cutting position. As the carriage 2 is raised a cam switch is caused to operate the pneumatic cylinder 44 which brings the clamp 27 for the composite strip 20 into the position in which it clamps the strip against the carriage table 46 and simultaneously a cam switch on the cam shaft causes the spindle 1 to stop. A further small rotation of the cam shaft 65 causes a pneumatic cylinder 45 to operate and raise the perforator 31 to perforate the composite strip 20 at a position between the clamp 27 and the tubular former. At the same time the film tension sensing bar 30 is released so that it rises under the action of a biasing spring 33 to press against the under surface of the composite strip 20. Another cam switch on the cam shaft 65 then causes the winding spindle 1 to start to rotate and to run for a set time, for example about 6 turns only, to sever the composite strip 20 where it has been perforated and to wind the wrapping film 22 around the completed element. At substantially the same time the sensing bar 30 rises under the action of its biasing spring 33, to cause the severed free end of the composite strip 20 to be withdrawn from the forward edge of the table 46, but not so far as to release it from the holding effect of the suction through the perforated end 47.

When the spindle 1 has automatically stopped after the limited number of revolutions, a further cam switch on the cam shaft 65 causes a heat sealer arm 34 (FIG. 1) to rotate in a clockwise direction and press a heated sealing pad 35 against the element to seal the last turn of wrapping film 22 to the last preceding turn.

After the pad 35 has been held against the element for a set time it is automatically released and the spindle 1 is again rotated for one turn with the object of leaving a free length of wrapping film 22 on the element. The next actions of the cam shaft 65 are to release a brake (not shown) on the pad 8 to permit the tension monitor 14 to move in an anti-clockwise direction and then engage a switch (not shown) to re-energize the brake on the pad to stop the pad rotating. The wrapping film 22 now lies in a slack loop thereby ensuring that when the wrapping film is cut the end of the film is not pulled back but is held in the wrapper arm 23 in a position such that it can be readily drawn into the nip. The cam shaft 65 then brings the wrapper arm 23 down again clamping the wrapping film 22 between the pressure member 32 and the table 46 and against the perforator 31 on the carriage to cause it to perforate the wrapping film. The winding spindle 1 is then restarted to sever the wrapping film 22 where it is perforated and the spindle is withdrawn to release the wound element, allowing it to fall onto a shelf 52. Continued rotation of the cam shaft 65 causes the wrapper arm 23 to be raised and the carriage 2 to be lowered.

Lowering of the carriage 2 causes a mechanism (not shown) to give the shelf 52 a tap to ensure that the wound element is lying substantially horizontally on the shelf and causes the shelf to become inclined to such an extent that the element rolls off the shelf and is guided by a plate 53 on to a pair of rollers 54 adapted to be driven by a motor 55. When the element is positioned on the rollers 54 the motor 55 is automatically started to drive the rollers and rotate the wound element a sufficient number of revolutions to wind the free length of wrapping film 22 left on the element. After the rollers 54 have been driven the requisite number of revolutions a lever 56, pivoted at one end and carrying a serrated heated bar 57 at its other, is caused to pivot in a clockwise direction by a cam mechanism to raise the heated bar 57 between the rollers 54, to lift the element out of contact with the rollers and to seal the outer layers of wrapping film lightly together. Operation of the heated bar 57 in this way is effected three times to seal the wrapping film in three places spaced around the circumference of the element. When light sealing of the element is completed the motor 55 is stopped and a lever 58 pivots in an anti-clockwise direction to cause a flap 59 to push the wound element off the rollers 54 so that it drops into a suitable receptacle.

While sealing of the free length of wrapping film 22 about a wound element is taking place on the rollers 54 the tube loader 26 rotates in an anti-clockwise direction to bring the next tubular former concentric with the winding spindle 1 and the forward movement of the winding spindle into the tube is commenced. Simultaneously, the timing cam shaft 65 is stopped and is not re-started until the operation of a micro switch (not shown) indicates that the spindle 1 has completely penetrated through the former supported on the arm of the loader 26. If the hexagonal spindle 1 should jam when it starts to enter the bore of a former the loader 26 is automatically caused to rotate clockwise, by further rotation of a separate cam shaft, to receive another former from the escapement 25 and the spindle is extracted to release the jammed former from its end. On operation of the micro switch indicating that the spindle 1 has completely penetrated the former, the tube loader 26 is retracted and the carriage 2 is advanced, until its end is beneath the spindle 1 and raised to a position (as shown in chain dotted lines) in which the leaf spring 49 on the table 46 is in light contact with the fresh former now carried on the spindle.

At this stage various pneumatic cylinders mounted in the carriage 2 are brought into action, as will now be described with reference to FIG. 2, to cause the free end of the composite strip 20 to be wrapped round the tubular former. Referring to FIG. 2, a first pneumatic cylinder 36 causes a pair of arms 37 to rock about a pivot 38 and raise the cranked bars 29 to a position in which the folding bar 28 is higher than the winding spindle 1. A second pneumatic cylinder 39 then moves a 'U' shaped slider 40 to the left to bring the folding bar 28 over the tubular former, against the action of a biasing spring (not shown). A third pneumatic cylinder 42 slides a stop 43 under the arms 37. The first pneumatic cylinder 36 then allows the arms 37 to drop on to the stop 43 and the cylinder 39 allows the slider 40 to move to the right so that, under the action of the biasing spring the folding bar 28 tucks the free end of the composite strip 20 under the tubular former. At this stage, under the action of a cam switch on the cam shaft 65, rotation of the spindle 1 at the slow speed is started. If the composite strip has been successfully trapped, the increase in tension of the composite strip 20 depresses the sensing bar 30 which, after it has travelled through approximately one-third of its distance of travel, operates a switch to actuate a relay to effect immediate stoppage of the motor 71 driving the spindle 1 and release of the clamp 27. The normal time lag that occurs during these two operations is allowed for by the time taken for the sensing bar to travel through the remaining two-thirds of its distance of travel. Actuation of the relay also causes the cam shaft 65 to start to initiate a series of operations to withdraw the folding bar 28 into its retracted position and lower the carriage 2. As soon as the clamp 27 is released the tension monitors 12 and 13 spring back and apply sufficient tension to the composite strip 20 to ensure that it is trapped around the tubular former until the motor driving the spindle 1 restarts.

When the clamp 27 is released a mechanical linkage on the clamp causes the sensing bar 30 to be locked in its retracted position. Further switches on the cam shaft 65 set the spindle revolution counter 70 and bring the spindle 1 up to the full speed to start a new winding operation. Rotation of the cam shaft 65 continues until it has completed one revolution when it automatically stops itself until winding of the next element has been completed.

Thereafter the cycle is repeated to wind further capacitor elements in exactly the same way as described above, until the machine is stopped.

What we claim as our invention is:

1. Apparatus for automatically producing wound capacitor elements from a composite strip, comprising (a) a mandrel; (b) a drive for rotatably driving the mandrel; (c) automatic timing means for starting and stopping rotation of the mandrel; (d) means for folding the leading end of the composite strip around the mandrel; (e) a temporary clamp for engaging the composite strip; (f) means for sensing the tension in the length of composite strip between the mandrel and the temporary clamp; and (g) means for starting up the automatic timing means when, upon rotation of the mandrel, an increase in tension in said length operates the sensing means as an indication that the leading end of the composite strip has been successfully folded around the mandrel and trapped, so that winding can commence.

2. Apparatus for automatically producing wound capacitor elements from a composite strip comprising (a) a mandrel; (b) a drive for rotatably driving the mandrel; (c) automatic timing means for starting and stopping rotation of the mandrel; (d) means for folding the leading end of the composite strip around the mandrel; (e) a temporary clamp for engaging the composite strip; (f) means for sensing the tension in the length of composite strip between the mandrel and the temporary clamp; (g) means for starting up the automatic timing means when, upon rotation of the mandrel, an increase in tension in said length operates the sensing means as an indication that the leading end of the composite strip has been successfully folded around the mandrel to form a capacitor element and trapped; and (h) means for measuring the length of composite strip wound onto the mandrel and for stopping the winding operation when the element is completely wound; the arrangement being such that when the automatic timing means starts it immediately stops the rotation of the mandrel, unclamps the composite strip, removes the means for folding the leading end of the composite strip around the mandrel from its operative position, and then restarts the mandrel and the measuring means.

3. Apparatus for automatically producing wound capacitor element from a composite strip comprising (a) a mandrel; (b) a drive for rotatably driving the mandrel; (c) automatic timing means for starting and stopping rotation of the mandrel; (d) a carriage which can be caused to approach or retreat from the plane of the composite strip as it moves onto the mandrel and which can be reciprocated and pivoted between a functional position and a retracted position, which latter position it occupies during the winding operation; (e) means for folding the leading end of the composite strip around the mandrel; (f) a temporary clamp for engaging the composite strip, the means for folding the end of the composite strip on the mandrel and the clamp for the strip being mounted on the carriage; (g) means for sensing the tension in the length of composite strip between the mandrel and the temporary clamp; (h) means for starting up the automatic timing means when, upon rotation of the mandrel, an increase in tension in said length operates the sensing means as an indication that the leading end of the composite strip has been successfully folded around the mandrel and trapped; and (i) means for measuring the length of composite strip wound onto the mandrel to form a capacitor element and for stopping the winding operation when the element is completely wound; the arrangement being such that when the automatic timing means starts it immediately stops the rotation of the mandrel, unclamps the composite strip, removes the means for folding the leading end of the composite strip around the mandrel from its operative position, and then restarts the mandrel and the measuring means.

4. Apparatus as claimed in claim 3, wherein the apparatus includes means for wrapping a covering strip around the wound element.

5. Apparatus as claimed in claim 4, wherein the carriage also carries means for partially severing the composite strip and the covering strip.

6. Apparatus as claimed in claim 5, wherein part of the carriage forms a table against which the free end of the composite strip when it is cut may be retained by suction means and against which the composite strip can be held by the clamp.

7. Apparatus as claimed in claim 4, wherein spindles for carrying pads of film to form the composite strip and for carrying a pad of covering strip project from a side of a vertical support and each spindle has an associated tension monitor for maintaining the tension in the film or strip at a desired value, each tension monitor comprising a spring biased pivoted frame mounted on the vertical support, a guide roller fixed with respect to the frame and a dancer roller mounted on the pivoted frame, the arrangement being such that movement of the pivoted frame in accordance with changes in the tension of the film or strip operates a control device for energizing a brake for the associated spindle.

8. Apparatus as claimed in claim 7, wherein between the tension monitor associated with the spindle for a pad of covering strip and the mandrel is a further pivoted frame serving as a wrapper arm and carrying rollers about which the strip will travel and a pressure member adapted to press the free end of the covering strip against the surface of the composite strip prior to wrapping of the covering strip about the mandrel.

9. Apparatus as claimed in claim 7, wherein an arm pivotably mounted on the vertical support carries at its free end heat sealer means, the arm being adapted to pivot when wrapping of the covering strip around the element is completed to cause the heat sealer means to contact the last turn of the covering strip and to seal it to the last preceding turn.

10. Apparatus as claimed in claim 3, wherein the mandrel comprises a retractable winding spindle adapted to carry a tubular former about which a capacitor element can be wound and wherein tubular formers are fed one by one from a source of supply on to the upper end of a loading arm which is pivoted at its lower end in such a way that it is adapted to fit a former on to the winding spindle as the spindle advances from a retracted position.

11. Apparatus as claimed in claim 3, wherein the means for folding the leading end of the composite strip around the mandrel comprises a retractable transverse bar operated by mechanism carried by the carriage, the bar being adapted to tuck the free end of the composite strip under the mandrel.

12. Apparatus as claimed in claim 3, wherein the sensing means comprises a bar that is in contact with the length of composite strip between the mandrel and the clamp during the operation of feeding the end of the strip around the mandrel and is withdrawn into an inoperative position, after it has caused the timing means to start.

13. Apparatus as claimed in claim 7, wherein a printing unit is provided for printing an identification code on a surface of the covering strip during its passage to the mandrel.

14. Apparatus as claimed in claim 3, having at least one fluid-operated cylinder controlled by a solenoid valve energized by a cam switch mounted on a cam shaft which forms the timing means of the apparatus, the cam shaft being driven by an electric motor in such a way as to complete one revolution during each winding cycle.

* * * * *